INVENTOR.
JEROME L. MURRAY
BY
JOHN P. CHANDLER
HIS ATTORNEY.

United States Patent Office 3,490,699
Patented Jan. 20, 1970

3,490,699
COMBINED HOSE, NOZZLE AND SPRINKLER
Jerome L. Murray, 652 1st Ave.,
New York, N.Y. 10016
Filed June 24, 1968, Ser. No. 739,543
Int. Cl. B05b 1/32
U.S. Cl. 239—458                  9 Claims

ABSTRACT OF THE DISCLOSURE

A combined nozzle and sprinkler for attachment to a hose comprising a tubular body having a bore including unthreaded and threaded sections which receive the threaded male hose fitting. The body has a wall at the forward end and a water discharge orifice and a valve assembly including a stem provided with a needle portion and a conical valve member to the rear of the needle portion, the stem being carried on a spider with openings. A spring urges the valve assembly rearwardly. The body is rearwardly movable on the male fitting by relative rotation between the parts, from a forward position where the orifice is in advance of the needle portion, to successive rearward positions, to vary the discharge pattern of liquid from the waterway.

---

This invention relates to a combined hose nozzle and sprinkler which combines in a single, two-part unit a relatively simple and inexpensive water discharge device which functions equally well as a conventional nozzle or as a sprinkler having a variety of sprinkling patterns for delivering water to a small area or to a larger area and in a substantially equal concentration over all parts of the areas.

SUMMARY OF THE INVENTION

The device of the present invention provides a tubular body section with a through bore having, first, a smooth section, and second, a threaded section wherein the threads receive standard, hose fitting male threads. A wall at the front end of the bore has a central discharge orifice. A valve assembly includes a needle portion mounted at the front end of a valve stem and being of smaller diameter than the orifice, and into which the needle portion sometimes travels. Spaced from, and to the rear of, the needle portion is a conical valve member which, when it travels full forward, closes the orifice. The valve assembly is mounted, either loosely or rigidly, on an apertured plate and spider freely movable in the bore.

The male hose fitting is slightly modified in that it has an annular recess at the rear of its standard thread section and receives an O ring which forms a seal between the hose fitting and the bore. This is important since the spray or discharge pattern of the water varies as the tubular body is screwed rearward, on the threaded male fitting, which moves therein in telescopic fashion. As the forward end of the male fitting moves forwardly, it contacts the spider and moves the valve assembly also forwardly, changing the spray pattern.

An important object of the invention is to provide a combined hose nozzle and sprinkler fitting for a hose, which is inexpensive to produce, in that no close machining tolerance of the parts is required and no problem is involved in converting the unit from one use to another.

Figure 1:
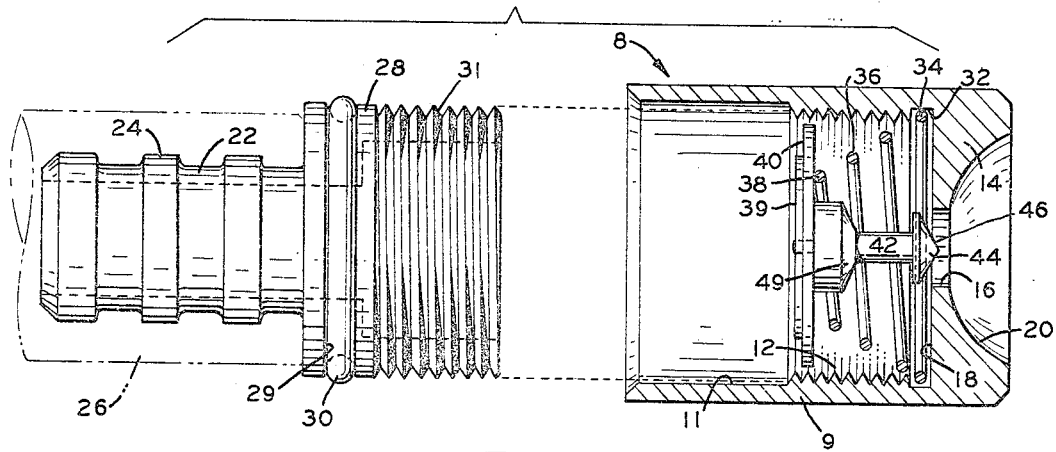
FIG. 1 is an exploded view showing a central longitudinal section taken through a combined nozzle and sprinkler of the present invention and the hose fitting which is connected with it.
Figure 2:
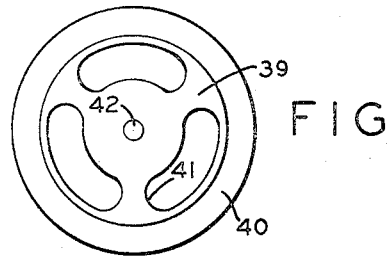
FIG. 2 is an elevation of the spider.

In FIG. 1, there is shown a central longitudinal section taken through a combined nozzle and sprinkler 8 of the present invention and it includes a generally cylindrical body member 9 having a bore extending from end to end. At its inlet end, the bore has a smooth section 11 which is followed by an internally threaded section 12 and at the discharge end there is a wall 14 formed with an outlet orifice 16 whose inner annular edge forms a valve seat. The wall has a flat inner surface 18 and towards the center it has a concave section 20. For convenience, in turning the body member for attachment to the male hose fitting, its outer surface may be rendered non-smooth in any fashion.

This fitting is shown in the exploded view of FIG. 1 and has a shank section 22 with ribs 24 for entry into the hose 26. Adjacent the shank section, the fitting is enlarged at 28 and is formed with an annualr recess 29 to receive an "O" ring 30. The balance of the enlarged section may have standard hose fitting threads 31.

The inner end of the bore of the nozzle 8 is formed with a short enlarged section 32 between the end wall 14 and the forward end of the internal thread section 12. This enlarged bore section receives the forward convolution 34 of a helical spring 36. The spring is of tapered contour with its forward convolution the larger and the smaller rear convolution 38 engages an apertured plate or spider 39. The inner face of the spider has a narrow annular recess 40 extending to its outer margin. It also has a number of openings 41 through which the water passes from the hose fitting 28 and thence into a waterway defined by the forward end of thread section 12, front end wall 14 and orfice 16. The spider has a central hole which receives in secured relation, as by welding, the rear end of a valve stem 42 which carries at its forward end a needle portion 44 having a diameter slightly smaller than the diameter of orifice 16, and having a conical forward face 46. The valve stem has a conical valve member 49 fixed near the rear of the stem and which, when in full forward position, closes the outlet orifice.

The length of first bore section 11 in the body is such that enlarged section 28 of hose fitting is fully within the body before threads 12 and 31 start to engage. When the forward end of enlarged section 28 contacts the spider, further movement causes the valve stem to move through the orifice. When the needle portion 44 is in the position of FIG. 1, a continuous stream of water comes forth and, when it is fully within orifice 16, a conical spray of water issues from the orifice since the needle is smaller than the orifice. The pattern of spray thus is varied depending on how far the body section is rotated rearwardly on the hose fitting.

Figure 3:
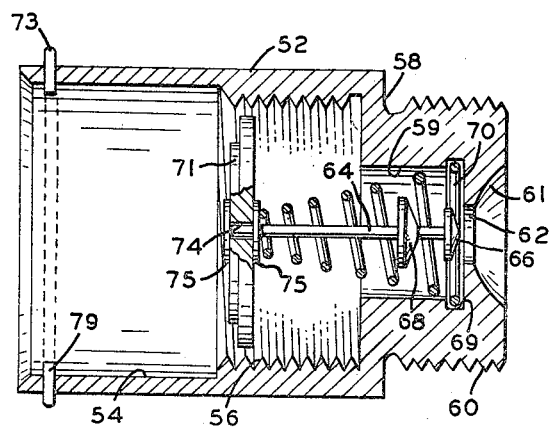
FIG. 3 shows a modification of the nozzle.

The modified nozzle of FIG. 3 can function in the same fashion as the one shown in FIG. 1 and has the further advantage that if an additional length of hose is required, the forward end of the nozzle can receive, in threaded relation, the rear or female fitting on the additional hose section.

It has a body section 52 with a through bore 54 and forward thread section 56 in the same relation as portions 11 and 12 have in FIG. 1. The forward wall 58, however, leads to a reduced body section having a bore 59 and an externally threaded section 60 of the same size as the threaded section 31 of the host fitting of FIG. 1. In other words, sections 60 and 31 have standard hose fitting threads. The forward end of this reduced section has a concave face 61 with a central outlet orifice 62. The valve stem 64 with its forward needle section 66 and rear valve member 68 has the same relation as those elements shown in FIG. 1. The forward end of bore 59 has an enlarged section 69 to receive the forward convolution 70 of the tapered helical spring which engages spider 71 at its rear end and the valve stem is supported by the spider as before. The valve stem is loosely mounted in this instance within the hole 74 in spider 71 and carries spaced plates 75 limiting longitudinal movement of the valve stem relative to the spider. This loose mounting is in many instances more effective than the rigid mounting indicated in FIG. 1 and it also has a self-centering action when the stream of water passes therethrough.

At the rear of the body section, there is a C ring 73 having radial terminals 79. In other words, this body section can be applied to the male hose fitting and removal is prevented until the C ring is removed.

While there have been described herein what are at present considered preferred embodiments of the invention it will be obvious to those skilled in the art that many modification and changes may be made therein without departing from the essence of the invention. It is therefore to be understood that the exemplary embodiments are illustrative and not restrictive of the invention.

What I claim is:

1. A combined nozzle and sprinkler for attachment to a hose having a threaded male fitting, and comprising a tubular body having a through bore including a first unthreaded section and a second threaded section which receives the threaded male fitting, a wall at the forward end of the body and having a circular discharge orifice for delivery of liquid therefrom, a valve assembly including a stem provided with a needle portion at its forward end of smaller diameter than the orifice, and a conical valve member to the rear of the needle portion, a spider with openings carried at the rear of the stem, and means urging the valve assembly to the rear of the orifice, a portion of the threaded section of the bore, the wall, and the orifice, forming a waterway, the body being rearwardly movable on the male fitting by relative rotation between the parts, from a forward position where the orifice is in advance of the needle portion, to successive rearward positions, to vary the discharge pattern of liquid from the waterway, to a final position where the conical valve member closes the waterway.

2. The structure of claim 1 wherein the relation between the contours of the discharge orifice and the needle portion, when positioned in the orifice, are such as to produce a conical spray pattern.

3. The structure of claim 1 wherein the conical valve member has a greater diameter than the orifice.

4. The structure of claim 1 wherein the means for urging the valve assembly rearwardly is a helical spring whose forward end is seated in a recess adjoining the wall and the rear end engages the spider.

5. The structure of claim 1 wherein the valve assembly is loosely mounted on the spider.

6. The structure of claim 1 wherein the male fitting carries a resilient ring forming a seal with the first bore section of the body.

7. The structure of claim 1 wherein the forward section of the body is of reduced diameter and is externally threaded to receive a female hose fitting.

8. The structure of claim 7 wherein a C ring is positioned at the rear of the body to retain a male fitting in the bore.

9. A combined nozzle and sprinkler for attachment to a hose having a threaded male fitting, and comprising a two part assembly including a threaded male fitting carried on the forward end of a length of hose, and tubular body having a through bore including a first unthreaded section which receives the threaded male fitting in telescopic relation, a wall at the forward end of the body having a discharge orifice for delivery of liquid therefrom, a valve assembly including a stem provided with a needle portion at its forward end of smaller diameter than the orifice, and a conical valve member to the rear of the needle portion, a spider with openings secured at the rear of the stem, and whose rear face is engaged by the male fitting to move the assembly forwardly and spring means urging the assembly rearwardly in the body, a portion of the threaded section of the bore, the wall, and the orifice, forming a waterway, the body being rearwardly movable on the male fitting, by relative rotation between the parts, from a forward position where the orifice is in advance of the needle portion, to successive rearward positions, to vary the discharge pattern of liquid from the waterway, to a final position where the conical valve member closes the waterway.

References Cited

UNITED STATES PATENTS 1,937,427  11/1933  Hanlan _____ 239—458

M. HENSON WOOD, Jr., Primary Examiner

M. Y. MAR, Assistant Examiner

U.S. Cl. X.R.

239—459, 582